United States Patent
Sue et al.

(10) Patent No.: US 8,006,347 B2
(45) Date of Patent: Aug. 30, 2011

(54) HINGE

(75) Inventors: Shyh-Chung Sue, Taipei Hsien (TW);
Yen-Tsang Ho, Taipei Hsien (TW);
Chun-Chieh Lee, Taipei Hsien (TW);
Chih-Lin Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 478 days.

(21) Appl. No.: 12/184,210

(22) Filed: Jul. 31, 2008

(65) Prior Publication Data
US 2009/0193624 A1 Aug. 6, 2009

(30) Foreign Application Priority Data
Jan. 31, 2008 (CN) ............ 2008 2 0300170 U

(51) Int. Cl.
*E05C 17/64* (2006.01)
(52) U.S. Cl. .............................. 16/338; 16/342
(58) Field of Classification Search ........... 16/277, 16/338, 339, 340, 386; 455/575.1, 575.3; 379/433.11, 433.13; 411/545, 338, 342
See application file for complete search history.

(56) References Cited

U.S. PATENT DOCUMENTS

| | | | | |
|---|---|---|---|---|
| 1,143,091 A * | 6/1915 | Stimpson | ............ | 411/545 |
| 3,761,867 A * | 9/1973 | Churla | ............ | 439/413 |
| 5,146,808 A * | 9/1992 | Hoshino | ............ | 74/531 |
| 6,170,120 B1 * | 1/2001 | Lu | ............ | 16/342 |
| 6,665,907 B1 * | 12/2003 | Lu | ............ | 16/340 |
| 6,772,983 B1 * | 8/2004 | Liao et al. | ............ | 248/291.1 |
| 6,813,813 B2 * | 11/2004 | Lu et al. | ............ | 16/342 |
| 7,082,642 B2 * | 8/2006 | Su | ............ | 16/340 |
| 7,082,643 B2 * | 8/2006 | Lu et al. | ............ | 16/340 |
| 7,124,473 B2 * | 10/2006 | Lu et al. | ............ | 16/342 |
| 7,404,236 B2 * | 7/2008 | Cho et al. | ............ | 16/340 |
| 7,451,523 B2 * | 11/2008 | Chen | ............ | 16/342 |
| 7,607,202 B1 * | 10/2009 | Lee | ............ | 16/342 |
| 7,823,254 B2 * | 11/2010 | Lin | ............ | 16/337 |
| 2005/0081334 A1 * | 4/2005 | Tai | ............ | 16/339 |
| 2005/0155183 A1 * | 7/2005 | Lu et al. | ............ | 16/340 |
| 2006/0117530 A1 * | 6/2006 | Lu et al. | ............ | 16/342 |
| 2006/0185126 A1 * | 8/2006 | Su | ............ | 16/340 |
| 2006/0272127 A1 * | 12/2006 | Chen | ............ | 16/340 |
| 2007/0101543 A1 * | 5/2007 | Lu et al. | ............ | 16/342 |

* cited by examiner

*Primary Examiner* — Victor Batson
*Assistant Examiner* — Roberta Delisle
(74) *Attorney, Agent, or Firm* — Altis Law Group, Inc.

(57) ABSTRACT

A hinge includes a shaft, a bracket, two washers, a resilient member assembly mating with the pole, and a fastener. The shaft includes a pole. The bracket includes a knuckle portion. The washers are mounted on the pole. The fastener is engaging with the pole and exerting force against the washers, and the resilient member assembly.

2 Claims, 3 Drawing Sheets

HINGE

BACKGROUND

1. Field of the Invention

The present invention relates to a hinge.

2. Description of Related Art

A foldable device, such as a notebook computer, a foldable mobile phone, and so on, generally includes a base, and a cover pivotally mounted on the base via a hinge. A conventional hinge includes a bracket mounted on the base, and a shaft with one end being mounted on the cover. The bracket has a barrel rotatably receiving an opposite end of the shaft.

Conventionally, the friction between the shaft and the barrel is too small to provide enough friction between them to position the cover at a desired angle after the cover is opened.

Therefore, the invention provides a hinge to obviate the aforementioned problems.

DETAILED DESCRIPTION

Figure 1:
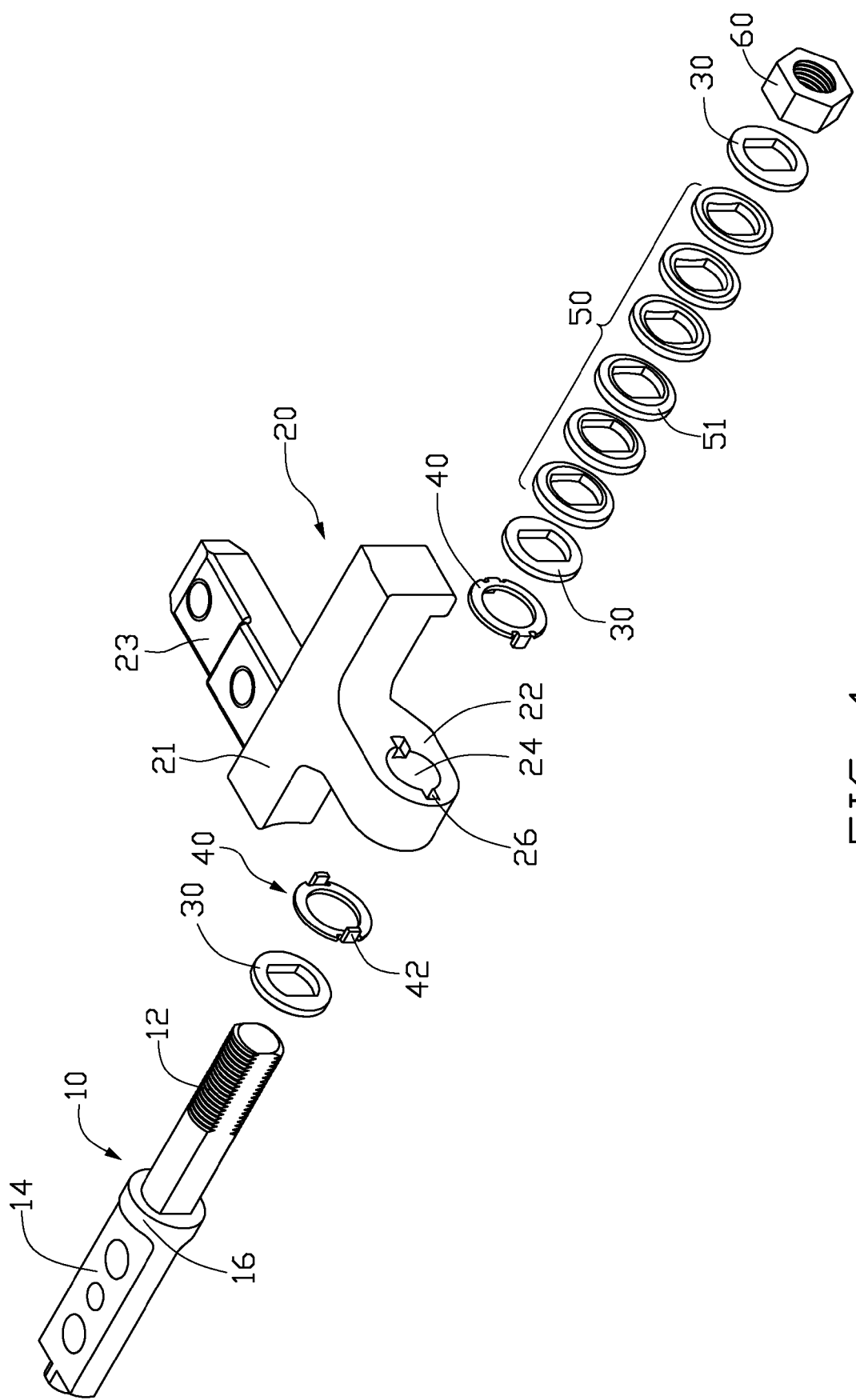
FIG. 1 is an exploded, isometric view of a hinge according to a first embodiment of the present invention.

Referring to FIG. 1, in a first embodiment of the present invention, a hinge includes a shaft 10, a bracket 20, a plurality of washers 30, two contacting members 40, a resilient member assembly 50, and a fastener 60.

The shaft 10 includes a pole 12 formed at an end thereof, and a mounting portion 14 formed at the opposite end thereof. The pole 12 has a non-circular double D cross-section. A threaded part is formed in a cylindrical outer surface of the pole 12. A flange 16 is formed between the pole 12 and the mounting portion 14.

The bracket 20 includes a main body 21 and a knuckle portion 22 extending from a side of the base 21, and a mounting portion 23 extending from the opposite side of the base 21. The knuckle portion 22 defines a round pivot hole 24, extending from a side to the opposite side of the knuckle portion 22. Each of the two opposite sides of the knuckle portion 22 defines two cutouts 26. The cutouts 26 communicate with the pivot hole 24.

Each of the washers 30 defines a through hole in a center thereof. The through hole of each of the washers 30 has a double D shape corresponding to a cross-section of the pole 12 of the shaft 10, the through holes are configured to mate with the pole 12. The pole 12 of the shaft 10 is insertable through the through hole of each of the washers 30, so that the shaft 10 is non-rotatable relative to the washers 30.

The contacting members 40 are configured to be disposed at opposite sides of the knuckle portion 22 thereby, sandwiching the knuckle portion 22 of the bracket 20 between them. Each of the contacting members 40 defines a circular through hole. The circular through hole allows the contacting members 40 to be rotatably sleeved on the pole 12 of the shaft 10. Two tabs 42 extend in a same perpendicular direction opposite edges of each of the contacting members 40. The tabs 42 are capable of engaging in the cutouts 26 correspondingly.

The resilient member assembly 50 includes a plurality of resilient washers 51 each defining a through hole in a center thereof. The through hole of each of the resilient washer 51 has a shape similar to the through hole of the washer 30. The pole 12 of the shaft 10 is capable of being inserted into the through holes of the resilient washer 51, so that the shaft 10 is non-rotatable in the axial direction relative to the resilient washers 51.

In this embodiment, the fastener 60 is a nut which is capable of engaging with the thread part of the pole 12, for pressing firmly against the washers 30, the contacting members 40, and the resilient member assembly 50.

Figure 2:
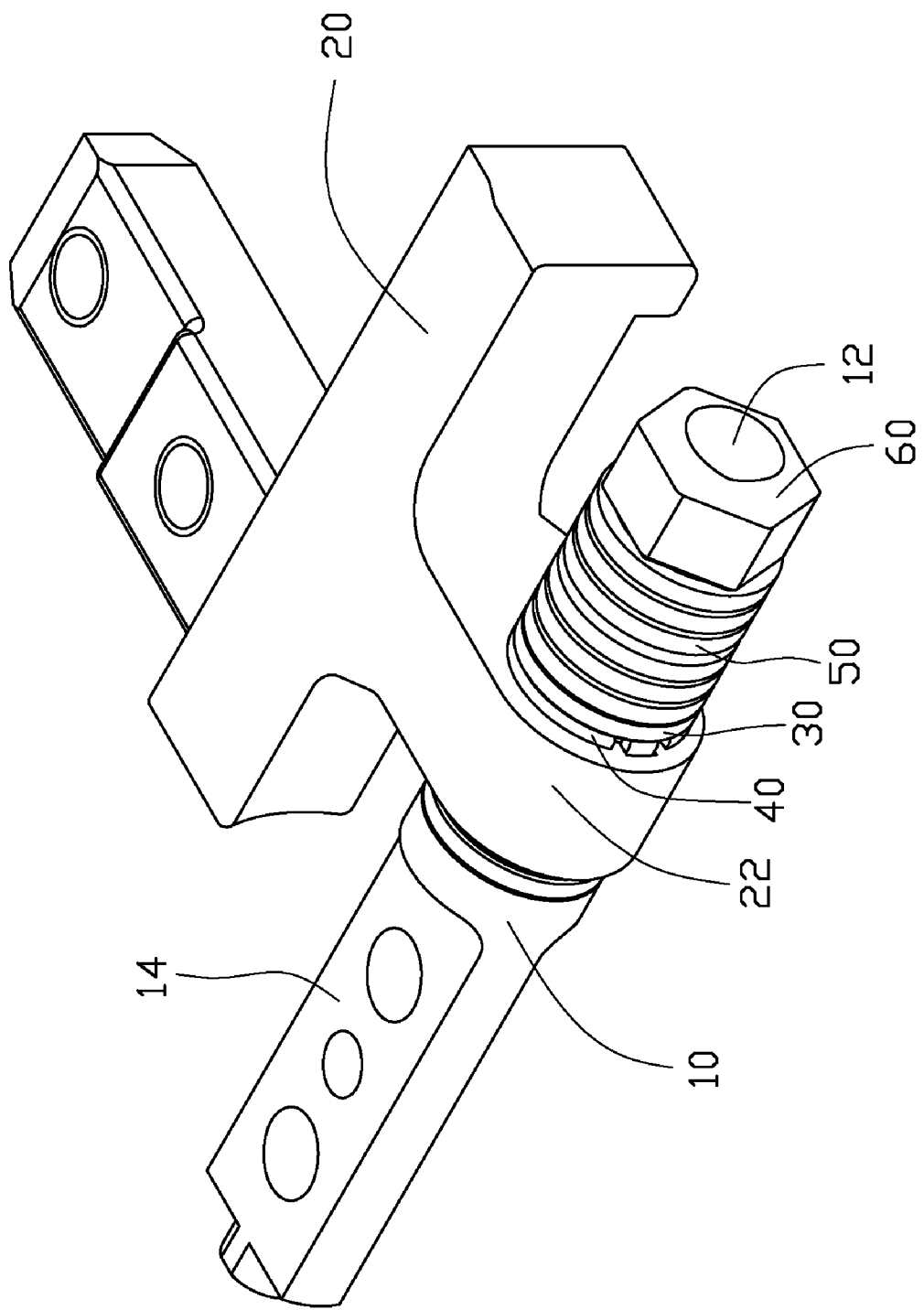
FIG. 2 is an assembled view of FIG. 1.

Referring also to FIG. 2, in assembly, the pole 12 of the shaft 10 is inserted through the through hole of one of the washers 30, the through hole of one of the contacting members 40, the pivot hole 24 of the knuckle portion 22, the through hole of the other one of the contacting members 40, the through hole of a second one of the washers 30, the through hole of the resilient washers 51 of the resilient member assembly 50, and the through hole of another one of the washer 30, in that order. Then the fastener 60 engages with the threaded part of the pole 12.

In use, the main body 21 of the bracket 20 is fixed to a base of a device (not shown). The shaft 10 is fixed to a cover of the device via the mounting portion 14 thereof. When the cover is rotated relative to the base, the shaft 10 rotates together with the cover to drive the washers 30 and the resilient member assembly 50 to rotate. Two of the washers 30 rub against the contacting members 40 to add the friction between the bracket 20 and the shaft 12.

Figure 3:
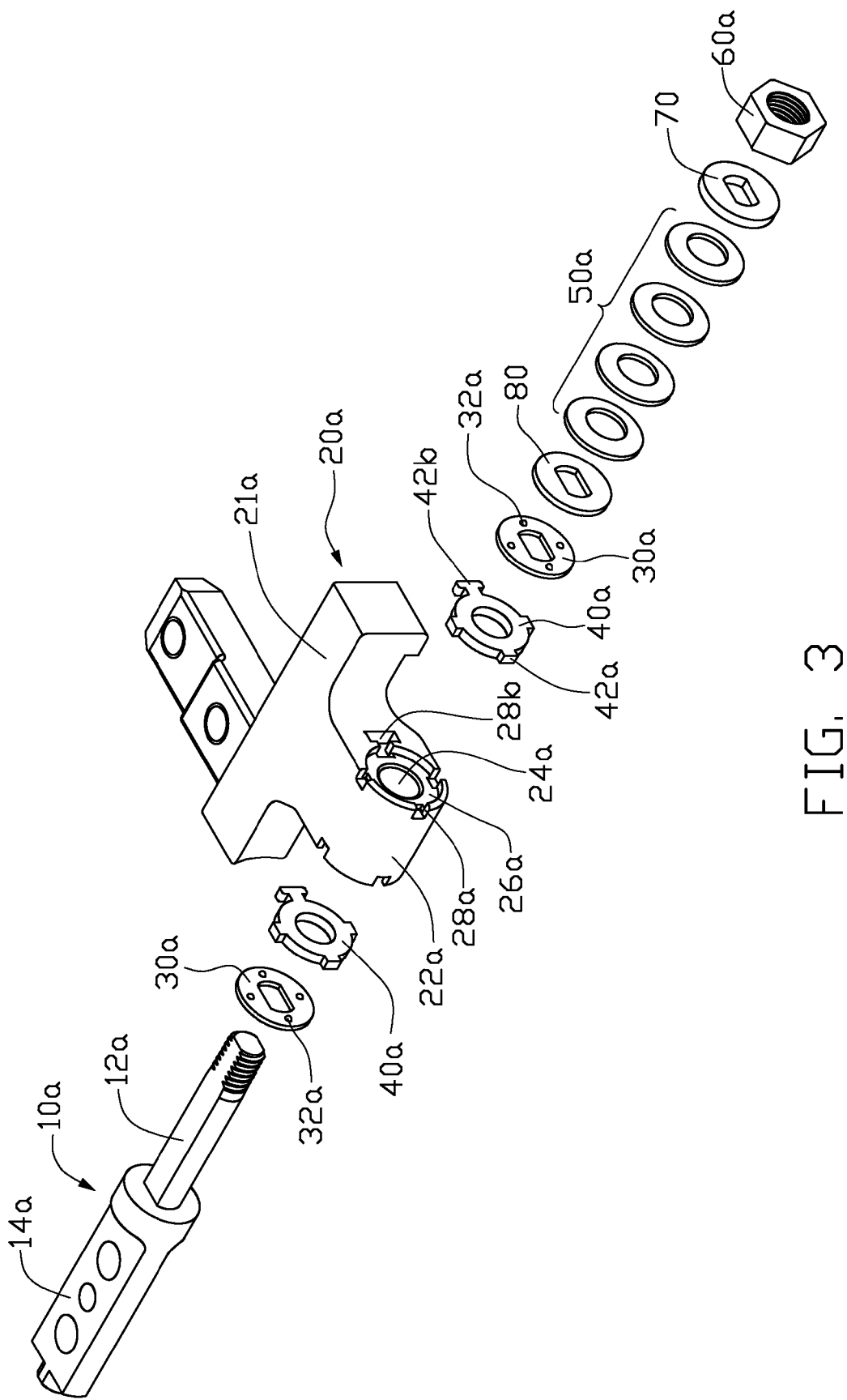
FIG. 3 is an exploded, isometric view of a hinge according to a second embodiment of the present invention.

Referring to FIG. 3, in a second embodiment of the present invention, a hinge includes a shaft 10a, a bracket 20a, two first washers 30a, two contacting members 40a, a resilient member assembly 50a, a fastener 60a, and two second washers 70, 80.

The shaft 10a is similar to the shaft 10 of the first embodiment, and has a pole 12a and a mounting portion 14a.

The bracket 20a is similar to the bracket 20 of the first embodiment. The bracket 20a includes a main body 21a and a knuckle portion 22a. The knuckle portion 22a defines a round pivot hole 24a. The differences of the bracket 20a from the first embodiment is that: in the second embodiment, two receiving portions 26a are defined in each side of the knuckle portion 22a, coaxial and communicating with the pivot hole 24a. The diameter of the receiving portions 26a are greater than that of the pivot hole 24a. Three cutouts 28a and a T-shaped slot 28b are defined in each side of the knuckle portion 22a, communicating with the pivot hole 24a.

The contacting members 40a are capable of being received in the receiving portions 26a of the bracket 20a. Three tabs 42a and a T-shaped block 42b radially extend outward from the edge of each of the contacting members 40a. The tabs 42a and the T-shaped block 42b are capable of engaging in the cutouts 28a and the T-shaped slot 28b.

The first washers 30a are similar to the washers 30 in the first embodiment except that a plurality of protrusions 32a are formed on opposite sides of each first washer 30a. The protrusions 32a are configured for increasing the friction between the first washers 30a and the contacting members 40a.

The resilient member assembly 50a includes a plurality of resilient washers each defining a round through hole in a center thereof.

The second washers 70, 80 are similar to the washers 30 in the first embodiment.

The fastener 60a is similar to the fastener 60 in the first embodiment.

While several embodiments have been disclosed, it is understood that any element disclosed in any one embodiment is easily adapted to other embodiments. It is also to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A hinge, comprising:
   a shaft comprising a pole, wherein the pole has a non-circular double D cross-section;
   a bracket comprising a knuckle portion;
   two washers mounted on the pole and located on the opposite side of the knuckle portion, wherein a through hole similar to the cross-section of the pole is defined in each of the washers, configured for mating with the pole, a round pivot hole is defined in the knuckle portion, and the pivot hole rotatably receives at least one portion of the pole;
   two contacting members each defining a through hole therein for the pole to extend through, each contacting member is mounted on one side of the knuckle portion and disposed between the knuckle portion and one of the two washers, wherein three cutouts are defined in each of the two sides of the knuckle portion, three tabs, corresponding to the cutouts, extends from each of the contacting members, a T-shaped slot is defined in each side of the knuckle portion, the cutouts and the T-shaped slot communicate with the pivot hole; each of the two contacting members defines a T-shaped block, each T-shaped block extends outward from the edge of each of the contacting members; the tabs and the T-shaped block engage the cutouts and the T-shaped slot;
   a resilient member assembly located on the pole; and
   a fastener engaging with the pole and exerting force against the washers, and the resilient member assembly.

2. The hinge as described in claim 1, wherein a plurality of protrusions is formed from two sides of each of the washers.

* * * * *